US007825917B2

(12) United States Patent
Bryant et al.

(10) Patent No.: US 7,825,917 B2
(45) Date of Patent: Nov. 2, 2010

(54) APPARATUS AND METHOD FOR ADJUSTING A DISPLAY USING AN INTEGRATED AMBIENT LIGHT SENSOR

(75) Inventors: Frank R. Bryant, Denton, TX (US); Frank J. Sigmund, Coppell, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 1178 days.

(21) Appl. No.: 11/390,115

(22) Filed: Mar. 27, 2006

(65) Prior Publication Data

US 2007/0222778 A1 Sep. 27, 2007

(51) Int. Cl.
*G09G 5/00* (2006.01)
*H04B 1/38* (2006.01)
*H04M 1/00* (2006.01)

(52) U.S. Cl. ........................ 345/207; 345/169; 455/566; 455/575.3

(58) Field of Classification Search ................. 345/102, 345/156–184, 207; 348/602–603; 455/566, 455/575.3

See application file for complete search history.

(56) References Cited

U.S. PATENT DOCUMENTS

| | | | | |
|---|---|---|---|---|
| 6,144,359 | A * | 11/2000 | Grave | 345/102 |
| 7,236,154 | B1 * | 6/2007 | Kerr et al. | 345/102 |
| 2006/0192749 | A1 * | 8/2006 | Lowles et al. | 345/102 |
| 2006/0256067 | A1 * | 11/2006 | Montero et al. | 345/102 |
| 2007/0018941 | A1 * | 1/2007 | Moyer et al. | 345/102 |

* cited by examiner

*Primary Examiner*—David L Lewis
(74) *Attorney, Agent, or Firm*—Lisa K. Jorgenson; William A. Munck

(57) ABSTRACT

An apparatus includes a display panel capable of displaying content. The apparatus also includes a light sensor having an integrated circuit and a photo-sensitive device. The photo-sensitive device is capable of measuring an amount of ambient light. The integrated circuit is capable of performing one or more functions associated with the display of the content on the display panel. The apparatus further includes a controller capable of adjusting one or more characteristics of the display panel based on the amount of ambient light measured by the light sensor. The integrated circuit and the photo-sensitive device may be formed on one side of a semiconductor wafer, and the photo-sensitive device may be exposed to the ambient light through an opening in an opposing side of the semiconductor wafer.

20 Claims, 2 Drawing Sheets

APPARATUS AND METHOD FOR ADJUSTING A DISPLAY USING AN INTEGRATED AMBIENT LIGHT SENSOR

TECHNICAL FIELD

This disclosure is generally directed to electronic devices and more specifically to an apparatus and method for adjusting a display using an integrated ambient light sensor.

BACKGROUND

Many electronic devices today include one or multiple integrated displays. For example, mobile telephones, personal digital assistants, portable computers, and other devices often include one or more thin film transistor (TFT) liquid crystal displays or other types of displays. These displays can be used for a wide variety of purposes, such as presenting text or graphical information to users.

Often times, these electronic devices operate using battery power. It is typically desirable to reduce the power consumption of the devices, thereby allowing the devices to operate longer using battery power. Also, these electronic devices can often be used in many different environments. Because of this, the devices are typically subjected to different illumination levels. It may be difficult for users to easily view the displays of the electronic devices under some of the illumination levels. As a particular example, users might be able to easily view the displays when in indoor areas, but the users may have difficulty viewing the displays after moving into outdoor areas or other brightly lit areas.

SUMMARY

This disclosure provides an apparatus and method for adjusting a display using an integrated ambient light sensor.

In a first embodiment, an apparatus includes a display panel capable of displaying content. The apparatus also includes a light sensor having an integrated circuit and a photo-sensitive device. The photo-sensitive device is capable of measuring an amount of ambient light. The integrated circuit is capable of performing one or more functions associated with the display of the content on the display panel. The apparatus further includes a controller capable of adjusting one or more characteristics of the display panel based on the amount of ambient light measured by the light sensor.

In particular embodiments, the integrated circuit and the photo-sensitive device are formed on one side of a semiconductor wafer, and the photo-sensitive device is exposed to the ambient light through an opening in an opposing side of the semiconductor wafer.

In a second embodiment, an integrated light sensor includes a photo-sensitive device capable of measuring an amount of ambient light. The integrated light sensor also includes an integrated circuit capable of performing one or more functions associated with displaying content on a display panel. The photo-sensitive device and the integrated circuit are formed on a single semiconductor substrate.

In a third embodiment, a method includes displaying content on a display panel using an integrated circuit. The integrated circuit is capable of performing one or more functions associated with the displaying of the content. The method also includes measuring an amount of ambient light using a photo-sensitive device integrated with the integrated circuit. In addition, the method includes adjusting one or more characteristics of the display panel based on the amount of ambient light measured by the photo-sensitive device.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
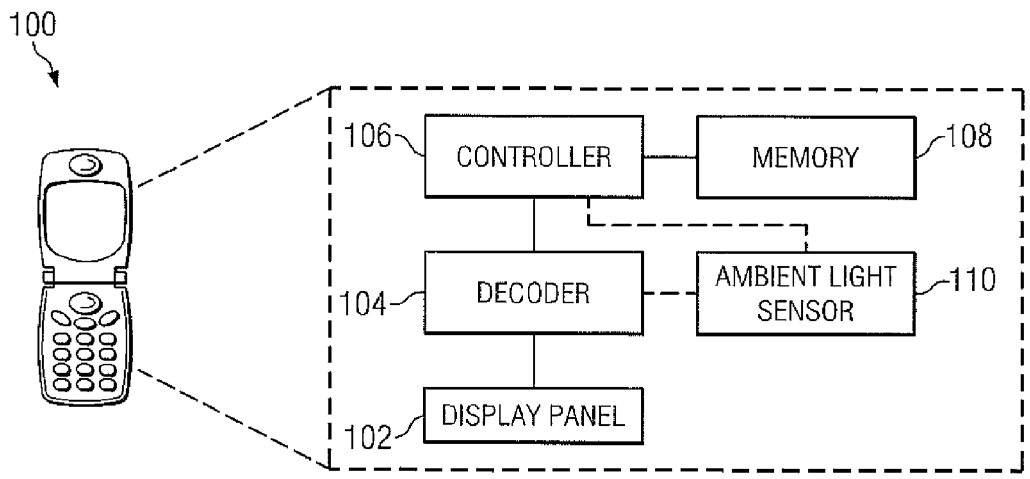
FIG. 1 illustrates an example device for adjusting a display using an integrated ambient light sensor according to one embodiment of this disclosure.

FIG. 1 illustrates an example device 100 for adjusting a display using an integrated ambient light sensor according to one embodiment of this disclosure. The device 100 shown in FIG. 1 is for illustration only. Other devices could implement a mechanism for adjusting a display using an integrated ambient light sensor without departing from the scope of this disclosure.

As shown in FIG. 1, the device 100 represents a mobile telephone. In this example, the device 100 includes components that are common to mobile telephones, including a keypad with navigation buttons and numeric keys, a microphone, and a speaker. The items within the dashed lines of FIG. 1 represent additional components of the device 100. In this example embodiment, the device 100 also includes at least one display panel 102. The display panel 102 represents a display capable of presenting text, graphics, or any other suitable content to a user of the device 100. In some embodiments, the device 100 may include multiple display panels 102, such as a larger display panel 102 over the keypad and a smaller display panel 102 that is visible when the device 100 is closed. The display panel 102 represents any suitable display, such as a thin film transistor (TFT) liquid crystal display.

The display 102 is coupled to a decoder 104. The decoder 104 is capable of receiving data defining the content to be displayed on the display panel 102 and causing the display panel 102 to display that content. For example, the data may identify the text, graphics, or other information to be displayed on the display panel 102. The decoder 104 may use this data to, for example, drive particular transistors in the display panel 102 into the appropriate states so that the display panel 102 presents the desired content. The decoder 104 includes any suitable structure for controlling the content presented on the display panel 102, such as a decoder chip.

A controller 106 is coupled to the decoder 104 and to a memory 108. The controller 106 controls the overall operation of the device 100. For example, in the embodiment where the device 100 represents a mobile telephone, the controller 106 could be responsible for establishing voice or data connections with a wireless network. As a particular example, the controller 106 could be responsible for generating the required messages to establish an outgoing or incoming telephone call. The controller 106 may also control the operation of the display panel 102. As an example, the controller 106 could provide data defining the content to be displayed on the display panel 102 to the decoder 104. The controller 106 includes any suitable hardware, software, firmware, or combination thereof for controlling one or more operational aspects of the device 100.

The memory 108 is capable of storing information for use by the controller 106. For example, the memory 108 could store instructions to be executed by the controller 106 and data used by the controller 106 during execution of the instructions. The memory 108 may include any suitable volatile and/or non-volatile storage and retrieval device or devices.

To support the use of the device 100 in different environments and to help reduce power consumption in the device 100, the device 100 in this example embodiment further includes an ambient light sensor 110. The ambient light sensor 110 is capable of measuring the amount of ambient light, or the light around the device 100. Measurements based on the amount of ambient light are provided to the controller 106, which may use the measurements to control the operation of the display panel 102. For example, the controller 106 could adjust the intensity, hue, or contrast of the display panel 102 based on the measurements from the ambient light sensor 110. The ambient light sensor 110 includes any suitable structure for measuring ambient light around the device 100. The ambient light sensor 110 may, for example, be integrated into other components of the device 100, such as the decoder 104.

Although FIG. 1 illustrates one example of a device 100 for adjusting a display using an integrated ambient light sensor, various changes may be made to FIG. 1. For example, the device 100 could include any other or additional components to provide voice, data, or other functions for users of the device 100. Also, the integrated ambient light sensor and its related functionality could be used in any other device or system.

Figure 2:
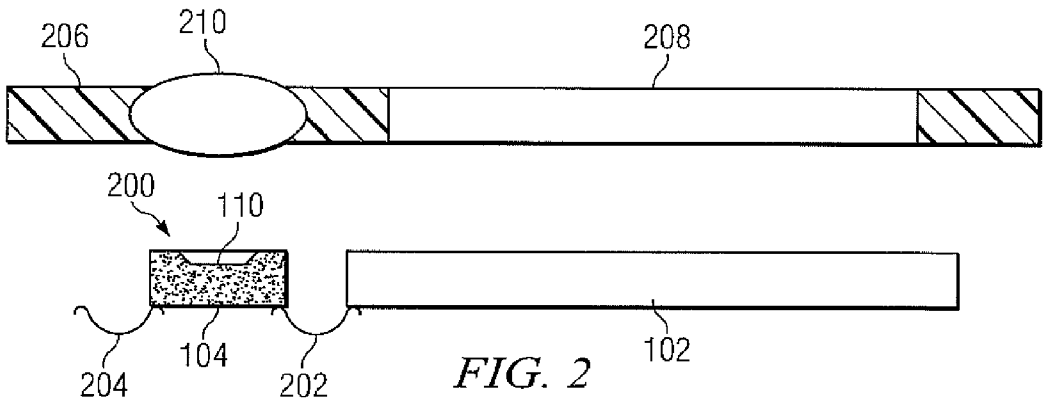
FIG. 2 illustrates additional details of an example device for adjusting a display using an integrated ambient light sensor according to one embodiment of this disclosure.

FIG. 2 illustrates additional details of an example device 100 for adjusting a display using an integrated ambient light sensor according to one embodiment of this disclosure. In this example, the display panel 102 is coupled to an integrated decoder/ambient light sensor 200. The integrated decoder/ambient light sensor 200 could, for example, include the decoder 104 and the ambient light sensor 110 shown in FIG. 1.

In this example, a flex interconnect 202 couples the display panel 102 and the integrated decoder/ambient light sensor 200. Similarly, the integrated decoder/ambient light sensor 200 is coupled to another component (such as the controller 106) using a flex interconnect 204. The flex interconnects 202-204 represent flexible electrical connections between components. The flex interconnects 202-204 may be useful, for example, when different components are coupled together across a pivot point in the device 100. As a particular example, as shown in FIG. 1, the device 100 represents a "flip-type" mobile telephone having an upper portion that can rotate towards and away from a lower portion. The flex interconnects 202-204 may be useful when different components are coupled to one another and the components reside in different portions of the mobile telephone.

As shown in FIG. 2, the device 100 also includes a cover 206 with a protection pane 208. The cover 206 covers and protects the various internal components of the device 100. For example, the cover 206 could represent a plastic or metal cover that protects the internal components of the device 100 (such as the decoder 104, controller 106, and memory 108) from damage. The cover 206 could be formed from any suitable material or materials.

The protection pane 208 represents a portion of the cover 206 that is used to protect the display panel 102. For example, the protection pane 208 may prevent external objects from contacting and scratching or otherwise damaging the display panel 102. The protection pane 208 may be formed from any suitable material or materials, such as one or more transparent materials.

As shown in this example, the device 100 also includes a lens 210. The lens 210 is used to focus light onto the integrated decoder/ambient light sensor 200. This may allow, for example, the ambient light sensor 110 in the integrated decoder/ambient light sensor 200 to take more accurate measurements of the ambient light. This may also allow a smaller ambient light sensor 110 to be used in the device 100. The lens 210 includes any suitable structure or structures for focusing light onto a light sensor. The lens 210 could, for example, represent a single lens or a collection of lenses (such as microlenses). While shown as including the lens 210 in FIG. 2, the use of the lens 210 in the device 100 is optional. In other embodiments, the lens 210 could be replaced by, for example, another protection pane, or the lens 210 could be positioned to receive light through the protection pane 208.

Although FIG. 2 illustrates additional details of one example of a device 100 for adjusting a display using an integrated ambient light sensor, various changes may be made to FIG. 2. For example, the ambient light sensor 110 could be located in any suitable location in the device 100.

Figure 3:
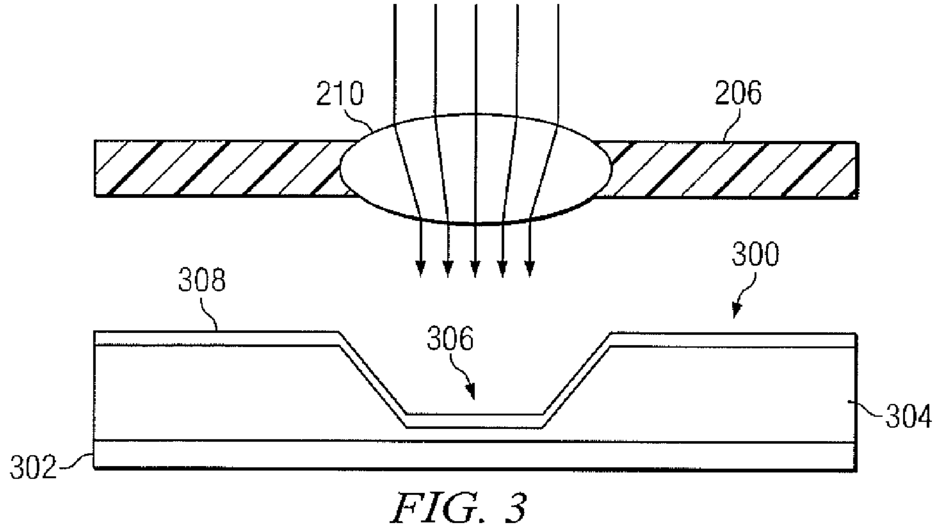
FIGS. 3 and 4 illustrate an example integrated ambient light sensor for use in adjusting a display according to one embodiment of this disclosure.
Figure 4:
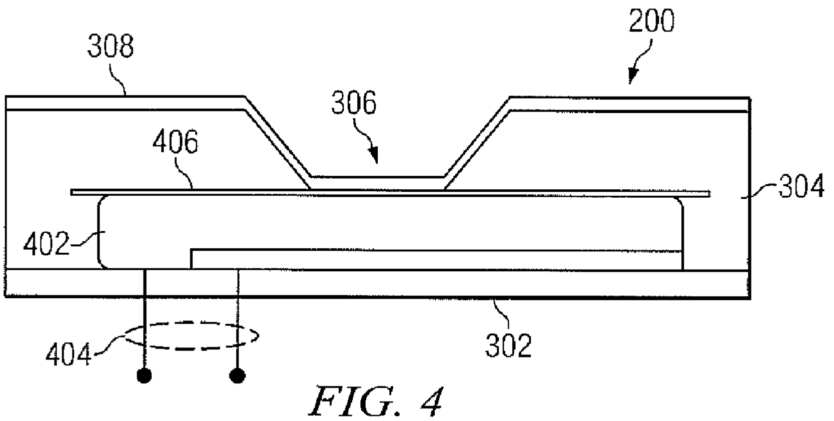

FIGS. 3 and 4 illustrate an example integrated ambient light sensor for use in adjusting a display according to one embodiment of this disclosure. The embodiment of the integrated ambient light sensor shown in FIGS. 3 and 4 is for illustration only. Other integrated ambient light sensors could be used without departing from the scope of this disclosure. Also, for ease of explanation, the integrated ambient light sensor shown in FIGS. 3 and 4 is described as operating in the device 100 of FIGS. 1 and 2. The integrated ambient light sensor could be used in any other suitable device or system.

As shown in FIG. 3, the integrated decoder/ambient light sensor 200 includes integrated circuit logic 302. The integrated circuit logic 302 represents logic for performing various functions in the device 100. For example, in the example where the ambient light sensor 110 is integrated with the decoder 104, the integrated circuit logic 302 may represent circuitry implementing the decoder 104. The integrated circuit logic 302 may represent circuitry capable of implementing any other or additional functionality in the device 100, such as power management functionality.

The integrated circuit logic 302 is formed on a substrate 304. The substrate 304 represents any suitable semiconductor substrate. The substrate 304 could, for example, represent a silicon substrate.

The integrated decoder/ambient light sensor 200 further includes a photo-sensitive device 306. The photo-sensitive device 306 is capable of detecting light and generating a signal based on the detected light. For example, the photo-sensitive device 306 could generate a current that is proportional to the amount of light striking the photo-sensitive device 306. The photo-sensitive device 306 includes any suitable structure for measuring an amount of light.

A protective layer 308 is disposed over the substrate 304 and the photo-sensitive device 306. The protective layer 308 may provide one or multiple forms of protection in the integrated decoder/ambient light sensor 200. For example, the protective layer 308 could provide mechanical protection, such as by protecting the underlying components from physical damage due to things like contact with external components. The protective layer 308 could also provide infrared protection, such as by protecting the photo-sensitive device 306 from exposure to excessive infrared radiation. The protective layer 308 could provide any other or additional form(s) of protection in the integrated decoder/ambient light sensor 200. While shown as a single layer in FIG. 3, the protective layer 308 could be formed from multiple layers, such as when each of multiple layers provides a different form of protection.

Any one or a combination of a wide variety of photo-sensitive devices 306 may be used in the integrated decoder/ambient light sensor 200. FIG. 4 illustrates one example of a type of photo-sensitive device 306 that could be used in the integrated decoder/ambient light sensor 200. As shown in FIG. 4, the photo-sensitive device 306 includes a p−/n+ junction 402. In this example, the p−/n+ junction 402 is capable of generating a current in response to light striking the p−/n+ junction 402. The p−/n+ junction 402 could be formed in any suitable manner, such as by doping or implanting suitable dopant(s) into the substrate 302.

The p−/n+ junction 402 is coupled to contacts 404. The contacts 404 provide the current generated by the p−/n+ junction 402 to another component in the device 100. For example, the contacts 404 could provide the generated current to the controller 106 for use in adjusting the operation of the display panel 102.

An etch stop 406 may be provided in the photo-sensitive device 306 to protect the p−/n+ junction 402. For example, the etch stop 406 may help to prevent an etch of the substrate 302 from entering into the regions forming the p−/n+ junction 402. In this way, the etch stop 406 may help to prevent damage or destruction of the p−/n+ junction 402 during fabrication, or the etch stop 406 may allow for sufficient substrate 304 to remain after an etch so that the p−/n+ junction 402 can be fabricated. The etch stop 406 includes any suitable material or materials in one or more layers, such as a boron etch stop layer.

The following represents two example methods for fabricating the integrated decoder/ambient light sensor 200. Other mechanisms could be used to produce the integrated decoder/ambient light sensor 200. Also, in the following description, the p−/n+ junction 402 is said to reside on the "front side" of a silicon wafer, and the p−/n+ junction 402 is said to be exposed through the "back side" of the silicon wafer. This is for ease of illustration and explanation only and is not meant to imply any specific limitation to the fabrication of the integrated decoder/ambient light sensor 200.

In one fabrication technique, a back side film deposition can be performed to deposit a hard mask on the back side of a silicon wafer. The hard mask could be formed from an oxide, silicon nitride, or other suitable material(s). The hard mask may be used later during a silicon wet etch step to expose the photo-sensitive device 306. A 1e19/cm$^3$ boron etch stop layer 406 is formed with an energy and dose appropriate to provide an etch stop at the desired depth. The p−/n+ junction 402 is formed on the front side of the silicon wafer. The back side of the wafer is then patterned, the hard mask is patterned and etched, and the back side of the wafer is etched to expose the p−/n+ junction 402. The back side of the wafer may be etched using any suitable technique, such as a wet chemistry technique using tetramethyl ammonia hydroxide (TMAH) or potassium hydroxide (KOH). One or more protective layers 308, such as a mechanical protective layer and an infrared protective layer, are deposited on the back side of the wafer.

In another fabrication technique, the hard mask, the boron etch stop layer 406, and the p−/n+ junction 402 are formed. The back side of the wafer is then patterned, the hard mask is patterned and etched, and the back side of the wafer is plasma etched (with or without wet chemistry). The one or more protective layers 308 are then formed on the back side of the wafer.

These represent two example fabrication techniques for forming the integrated decoder/ambient light sensor 200. Any other suitable technique could be used to fabricate the integrated decoder/ambient light sensor 200. For example, laser ablation could be used on the back side of the wafer to expose the p−/n+ junction 402. As another example, the p−/n+ junction 402 could be formed on the back side of the wafer, with appropriate electrical connections to the desired component.

Although FIGS. 3 and 4 illustrate one example of an integrated ambient light sensor for use in adjusting a display, various changes may be made to FIGS. 3 and 4. For example, any suitable photo-sensitive device 306 could be used in the integrated ambient light sensor. Also, the etch stop 406 is optional in the integrated ambient light sensor and need not be used. As a particular example, the etch stop 406 may be omitted when a device-characterized timed wet etch is used to expose the p−/n+ junction 402.

Figure 5:
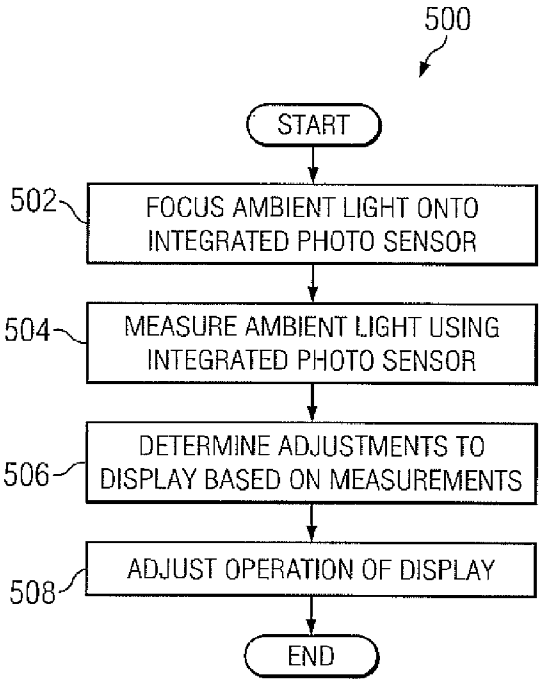
FIG. 5 illustrates an example method for adjusting a display using an integrated ambient light sensor according to one embodiment of this disclosure.

FIG. 5 illustrates an example method 500 for adjusting a display using an integrated ambient light sensor according to one embodiment of this disclosure. For ease of explanation, the method 500 is described with respect to the device 100 of FIGS. 1 through 4. The method 500 could be used in any suitable device or system.

The device 100 focuses ambient light onto an integrated ambient light sensor at step 502. This may include, for example, one or more lenses 210 focusing the ambient light onto the integrated decoder/ambient light sensor 200.

The device 100 measures ambient light using the integrated ambient light sensor at step 504. This may include, for example, the integrated decoder/ambient light sensor 200 generating a current that is proportional to the amount of light striking the integrated decoder/ambient light sensor 200.

The device 100 determines how to adjust a display based on the measurements at step 506. This may include, for example, the controller 106 receiving the currents generated by the integrated decoder/ambient light sensor 200, where the currents represent the measured ambient light. This may also include the controller 106 determining how to adjust the intensity, hue, or contrast of the display panel 102 using the ambient light measurements.

The device 100 adjusts operation of the display at step 508. This may include, for example, the controller 106 adjusting the intensity, hue, or contrast of the display panel 102. By adjusting the operation of the display panel 102, the device 100 may use less power over time, which may help to lengthen the amount of time that the device 100 may operate using battery power. Also, this may allow the device 100 to adjust the operation of the display panel 102 in different illumination conditions, thereby increasing the viewability of the display panel 102 in these different illumination conditions.

Although FIG. 5 illustrates one example of a method 500 for adjusting a display using an integrated ambient light sensor, various changes may be made to FIG. 5. For example, the focusing performed in step 502 could be omitted.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:

a display panel configured to display content;

a light sensor comprising an integrated circuit and a photo-sensitive device, the photo-sensitive device configured to measure an amount of ambient light, the integrated circuit configured to perform one or more functions associated with the display of the content on the display panel; and a controller configured to adjust one or more characteristics of the display panel based on the amount of ambient light measured by the light sensor, wherein the integrated circuit and the photo-sensitive device are formed on one side of a semiconductor wafer, and the photo-sensitive device is exposed to the ambient light through an opening in an opposing side of the semiconductor wafer.

2. The apparatus of claim 1, wherein the integrated circuit comprises at least one of: a decoder and a power manager.

3. The apparatus of claim 1, wherein:

the integrated circuit comprises a decoder configured to decode data associated with the content displayed on the display panel.

4. The apparatus of claim 1, further comprising:

a lens configured to focus the ambient light onto the photo-sensitive device.

5. The apparatus of claim 1, wherein the photo-sensitive device comprises a p−/n+ junction.

6. The apparatus of claim 1, wherein the controller is configured to adjust one or more of: an intensity, a hue, and a contrast of the display panel based on the amount of ambient light measured by the light sensor.

7. An integrated light sensor, comprising:

a photo-sensitive device configured to measure an amount of ambient light; and an integrated circuit configured to perform one or more functions associated with displaying content on a display panel;

wherein the photo-sensitive device and the integrated circuit are formed on a single semiconductor substrate, and wherein the integrated circuit and the photo-sensitive device are formed on one side of the semiconductor substrate, and the photo-sensitive device is exposed to the ambient light through an opening in an opposing side of the semiconductor substrate.

8. The integrated light sensor of claim 7, wherein the integrated circuit comprises at least one of: a decoder and a power manager.

9. The integrated light sensor of claim 7, further comprising an etch stop between the photo-sensitive device and the opening in the opposing side of the semiconductor wafer.

10. The integrated light sensor of claim 7, further comprising:

a lens configured to focus the ambient light onto the photo-sensitive device.

11. The integrated light sensor of claim 7, wherein the photo-sensitive device comprises a p−/n+ junction.

12. The integrated light sensor of claim 7, further comprising at least one contact configured to couple the photo-sensitive device to an external component.

13. The integrated light sensor of claim 12, wherein the external component comprises a controller configured to adjust one or more of: an intensity, a hue, and a contrast of the display panel based on the amount of ambient light measured by the photo-sensitive device.

14. The integrated light sensor of claim 7, further comprising at least one protective layer disposed over the photo-sensitive device, the at least one protective layer configured to provide at least one of: mechanical protection and infrared protection.

15. A method, comprising:

displaying content on a display panel using an integrated circuit, the integrated circuit configured to perform one or more functions associated with the displaying of the content;

measuring an amount of ambient light using a photo-sensitive device integrated with the integrated circuit; and adjusting one or more characteristics of the display panel based on the amount of ambient light measured by the photo-sensitive device, wherein the integrated circuit and the photo-sensitive device are formed on one side of a semiconductor wafer, and the photo-sensitive device is exposed to the ambient light through an opening in an opposing side of the semiconductor wafer.

16. The method of claim 15, further comprising focusing the ambient light onto the photo-sensitive device.

17. The method of claim 15, wherein:

the integrated circuit comprises a decoder configured to decode data associated with the content displayed on the display panel.

18. The method of claim 15, wherein the integrated circuit comprises at least one of: a decoder and a power manager.

19. The method of claim 15, wherein the photo-sensitive device comprises a p−/n+ junction.

20. The method of claim 15, wherein the one or more characteristics of the display panel includes one or more of: an intensity, a hue, and a contrast of the display panel.

* * * * *